(12) United States Patent
Huh et al.

(10) Patent No.: US 11,157,603 B2
(45) Date of Patent: Oct. 26, 2021

(54) ELECTRONIC DEVICE AND METHOD FOR PERFORMING AUTHENTICATION

(71) Applicant: Samsung Electronics Co., Ltd., Gyeonggi-do (KR)

(72) Inventors: Jae-Young Huh, Seoul (KR); Dae-Hyun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 16/344,963

(22) PCT Filed: Oct. 26, 2017

(86) PCT No.: PCT/KR2017/011919
§ 371 (c)(1),
(2) Date: Apr. 25, 2019

(87) PCT Pub. No.: WO2018/080198
PCT Pub. Date: May 3, 2018

(65) Prior Publication Data
US 2019/0272365 A1 Sep. 5, 2019

(30) Foreign Application Priority Data
Oct. 27, 2016 (KR) .................... 10-2016-0141051

(51) Int. Cl.
*H04L 9/00* (2006.01)
*G06F 21/32* (2013.01)
(Continued)

(52) U.S. Cl.
CPC .............. *G06F 21/32* (2013.01); *G06F 21/34* (2013.01); *G06F 21/45* (2013.01); *H04W 12/068* (2021.01)

(58) Field of Classification Search
USPC ........................................... 726/16
See application file for complete search history.

(56) References Cited

U.S. PATENT DOCUMENTS

| 6,880,079 B2* | 4/2005 | Kefford ................. G06F 21/42 713/155 |
| 2009/0158033 A1* | 6/2009 | Jeong ................. H04L 63/0838 713/156 |

(Continued)

FOREIGN PATENT DOCUMENTS

| KR | 10-2013-0094359 A | 8/2013 |
| KR | 10-2014-0085280 A | 7/2014 |

(Continued)

*Primary Examiner* — Christopher J Brown
(74) *Attorney, Agent, or Firm* — Cha & Reiter, LLC

(57) ABSTRACT

The present invention relates to an electronic device and a method for performing authentication. The electronic device of the present invention comprises: a communication module; a memory; a processor electrically connected to the communication module and the memory; and an authentication module configured so as to be stored in the memory and executed by the processor, wherein the authentication module can be configured so as to transmit, on the basis of at least a part of a request, authentication information stored in the memory to an external electronic device, when the authentication request related to the external electronic device is obtained.

10 Claims, 13 Drawing Sheets

(51) Int. Cl.
*G06F 21/34* (2013.01)
*G06F 21/45* (2013.01)
*H04W 12/06* (2021.01)

(56) References Cited

U.S. PATENT DOCUMENTS

| | | | |
|---|---|---|---|
| 2012/0208501 A1* | 8/2012 | Tsuda | H04M 1/67 |
| | | | 455/411 |
| 2013/0168450 A1* | 7/2013 | von Mueller | H04L 9/0618 |
| | | | 235/449 |
| 2013/0174239 A1 | 7/2013 | Kim et al. | |
| 2015/0341348 A1* | 11/2015 | Yang | H04L 63/0428 |
| | | | 726/7 |
| 2016/0081133 A1 | 3/2016 | Kim et al. | |
| 2018/0041339 A1 | 2/2018 | Lee | |

FOREIGN PATENT DOCUMENTS

| | | |
|---|---|---|
| KR | 10-2014-0085295 A | 7/2014 |
| KR | 10-1534753 B1 | 7/2015 |
| KR | 10-2016-0098904 A | 8/2016 |

\* cited by examiner

ELECTRONIC DEVICE AND METHOD FOR PERFORMING AUTHENTICATION

CROSS-REFERENCE TO RELATED APPLICATION(S)

This application is a National Phase Entry of PCT International Application No. PCT/KR2017/011919, which was filed on Oct. 26, 2017, and claims priority to Korean Patent Application No. 10-2016-0141051, which was filed on Oct. 27, 2016, the contents of which are incorporated herein by reference.

BACKGROUND

1. Field

The present disclosure relates to an electronic device and method for performing authentication. More specifically, the present disclosure relates to a method for an electronic device to perform authentication with respect to another electronic device.

2. Description of the Related Art

Recently, in a portable electronic device such as a smartphone, a tablet personal computer (PC), etc., functions such as door unlocking, credit payment, peripheral device recognition, etc., using short-range wireless communication have been provided.

An access to a website with a browser, etc. requires a log-in process, and a user directly enters an identification (ID) and a password as requested on the website. When additional security is needed, means such as a one-time password (OTP), a security card, an automatic response system (ARS), text message verification, etc., are used in combination.

SUMMARY

However, for door unlocking or credit payment using wireless communication, much effort may be required to prevent hacking from occurring via a wireless communication network, and for this reason, such functions have been used limitedly only when a terminal and a device are such close as to almost contact each other. The ID and the password for log-in to the website inevitably depend on user's memory, and an OTP terminal, a security card, an ARS, text message verification, etc., used for additional security may be cumbersome and time-consuming due to a complicated procedure.

Various embodiments of the present disclosure provide an electronic device and a method for performing authentication in which by using a portable electronic device, another device may be conveniently authenticated or automatic log-in to a website being used on a browser of the other device or personalization of the other device may be performed, while guaranteeing security.

According to various embodiments of the present disclosure, an electronic device may include a communication module, a memory, a processor electrically connected with the communication module and the memory, and an authentication module stored in the memory and configured to be executed by the processor, in which the authentication module is further configured to transmit authentication information stored in the memory to an external electronic device, based on at least a part of an authentication request related to the external electronic device when obtaining the authentication request.

According to various embodiments of the present disclosure, a method for performing authentication related to an external electronic device by an electronic device includes transmitting authentication information stored in a memory, based on at least a part of a request for authentication related to the external electronic device, upon obtaining the request.

According to various embodiments of the present disclosure, in a computer recording medium having stored therein an authentication module executed by at least one processor and configured to perform authentication related to an external electronic device in an electronic device, the authentication module is configured to transmit authentication information stored in a memory, based on at least a part of a request for authentication related to the external electronic device, upon obtaining the request.

According to various embodiments of the present disclosure, an electronic device and a method for performing authentication are provided in which by using a portable electronic device, another device may be conveniently authenticated or automatic log-in to a website being used on a browser of the other device or personalization of the other device may be performed, while guaranteeing security.

DETAILED DESCRIPTION

Figure 1:
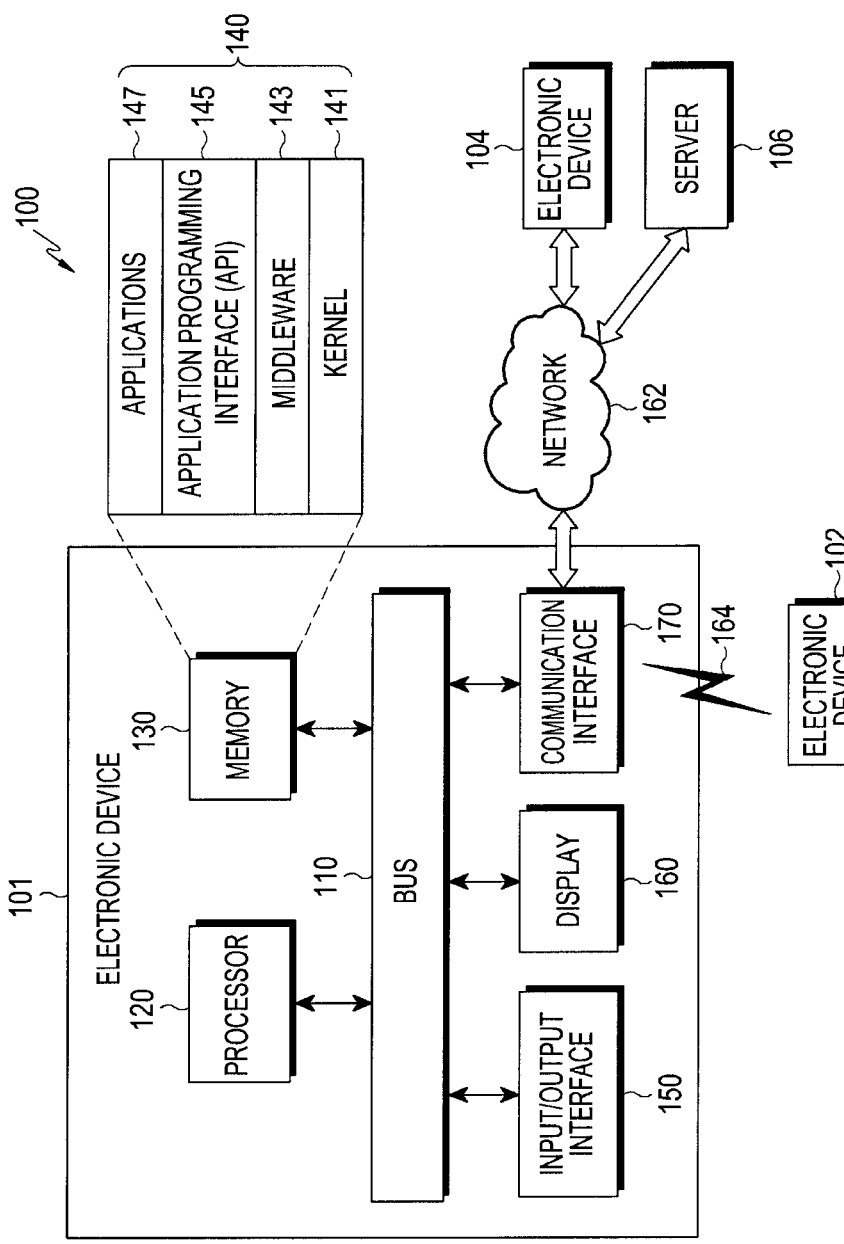
FIG. 1 is a block diagram of an electronic device in a network environment according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 2170 and delivering communication (e.g., a control message or data) between the elements 110 to 170. The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or a part of a body of a user. The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may include cellular communication using at least one of Long-Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to an embodiment, the wireless communication may include a global navigation satellite system (GNSS). The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of a universal serial bus (USB), a high definition multimedia interface (HDMI), Recommended Standard 232 (RS-232), power line communication, a plain old telephone service (POTS), or the like. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
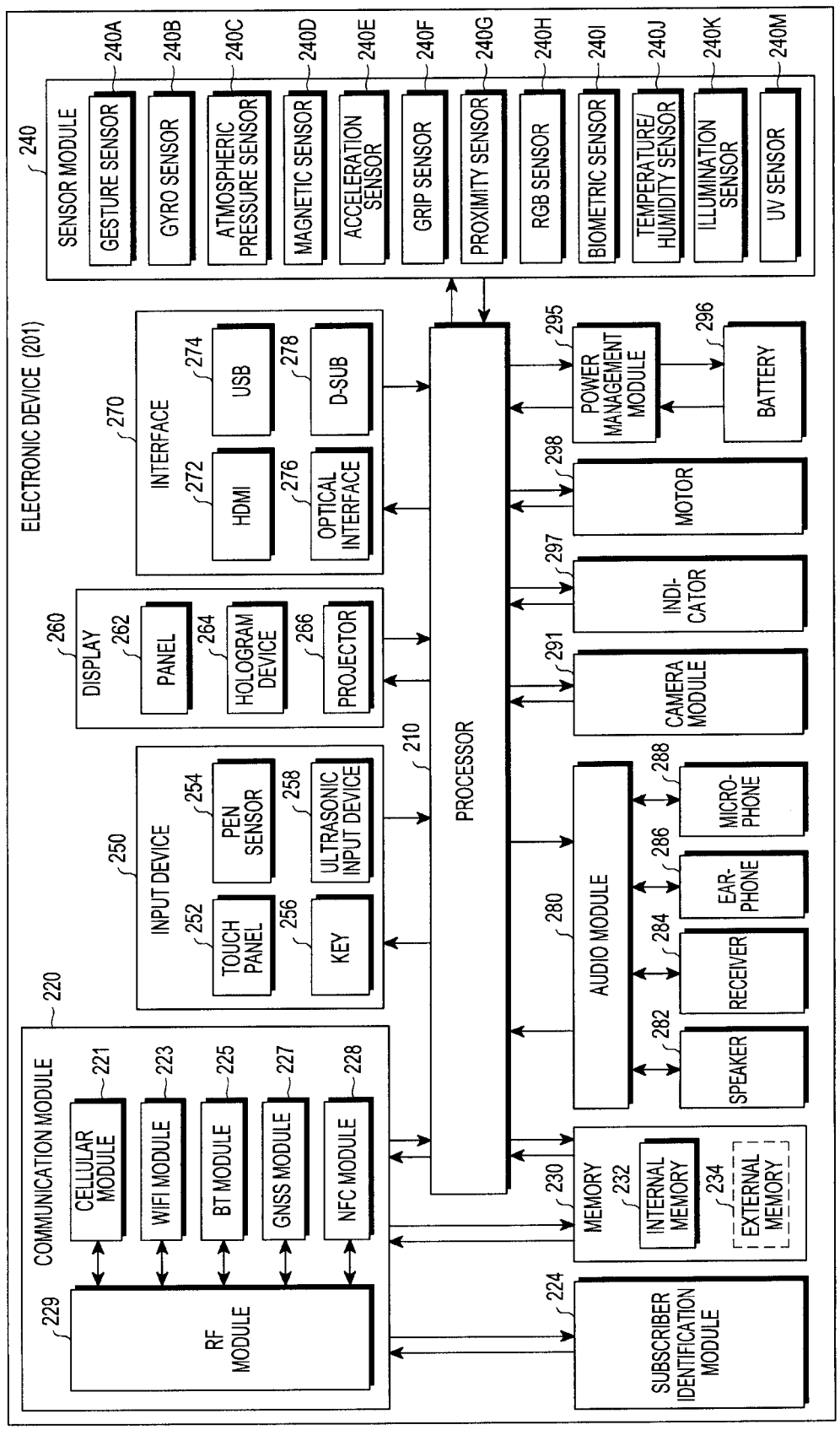
FIG. 2 is a block diagram of an electronic device according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an operating system (OS) or an application program, and performs processing and operations with respect to various data. The processor 210 may be implemented with, for example, a system on chip (SoC). According to an embodiment of the present disclosure, the server 210 may include a graphic processing unit (GPU) and/or an image signal processor. The processor 210 may include at least some of the elements illustrated in FIG. 2 (e.g., the cellular module 221). The processor 210 loads a command or data received from at least one of other elements (e.g., a non-volatile memory) into a volatile memory to process the command or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, an NFC module 228, and a radio frequency (RF) module 229. The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 may perform at least one of functions that may be provided by the processor 210. According to an embodiment, the cellular module 221 may include a communication processor (CP). According to an embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module. The SIM 224 may, for example, include a card including a SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random-access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid-state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201. The interface 270 may include an HDMI 272, a USB 274, an optical communication 276, or a D-subminiature (D-sub) 278. The interface 270 may be included in the communication interface 170 illustrated in FIG. 1. Additionally or alternatively, the interface 270 may include, for example, a mobile high-definition link (MHL) interface, an SD card/MMC interface, or an Infrared Data Association (IrDA) standard interface.

The audio module 280 may bi-directionally convert sound and an electric signal. At least one element of the audio module 280 may be included in the input/output interface 145 illustrated in FIG. 1. The audio module 280 may process sound information input or output through the speaker 282, the receiver 284, the earphone 286, or the microphone 288. The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
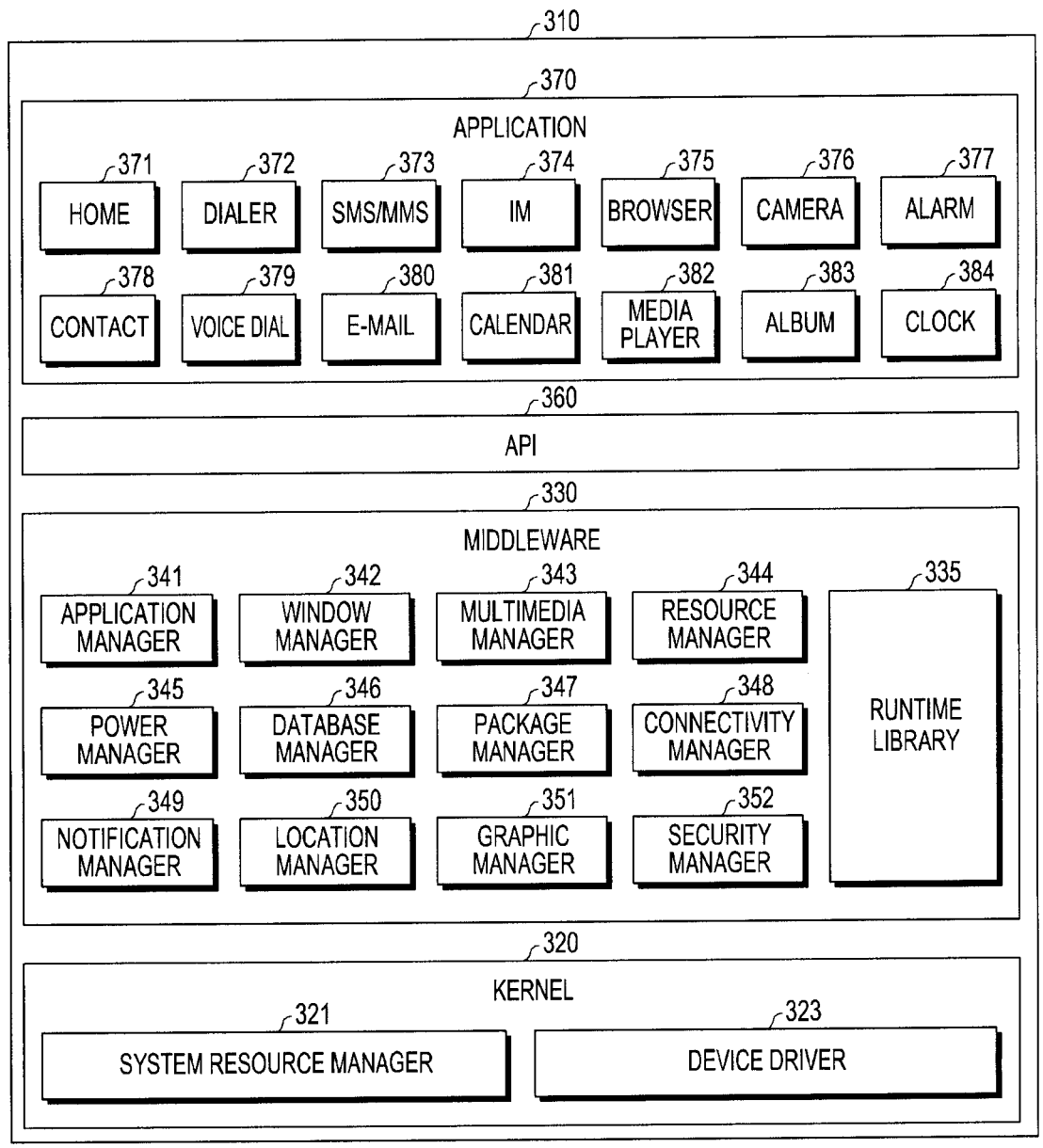
FIG. 3 is a block diagram of a programming module according to various embodiments of the present disclosure.

FIG. 3 is a block diagram of a programming module according to various embodiments. According to an embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Bada™. Referring to FIG. 3, the programming module 310 may include a kernel 320 (e.g., the kernel 141), middleware 330 (e.g., the middleware 143), an application programming interface (API) 360

(e.g., the API 145), and/or an application 370 (e.g., the application program 147). At least a part of the programming module 310 may be preloaded on an electronic device or may be downloaded from an external device (e.g., the vehicle device 102, the electronic device 104, or the server 106).

The kernel 320 may include a system resource manager 321 and/or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370. The window manager 342 manages a graphic user interface (GUI) resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format.

The connectivity manager 348 manages a wireless connection. The notification manager 349 provides an event, e.g., an arriving message, an appointment, proximity notification, etc. The location manager 350 manages location information of an electronic device. The graphic manager 351 manages, for example, a graphic effect to be provided to a user or a user interface relating thereto. The security manager 352 provides, for example, system security or user authentication. According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

Figure 4:
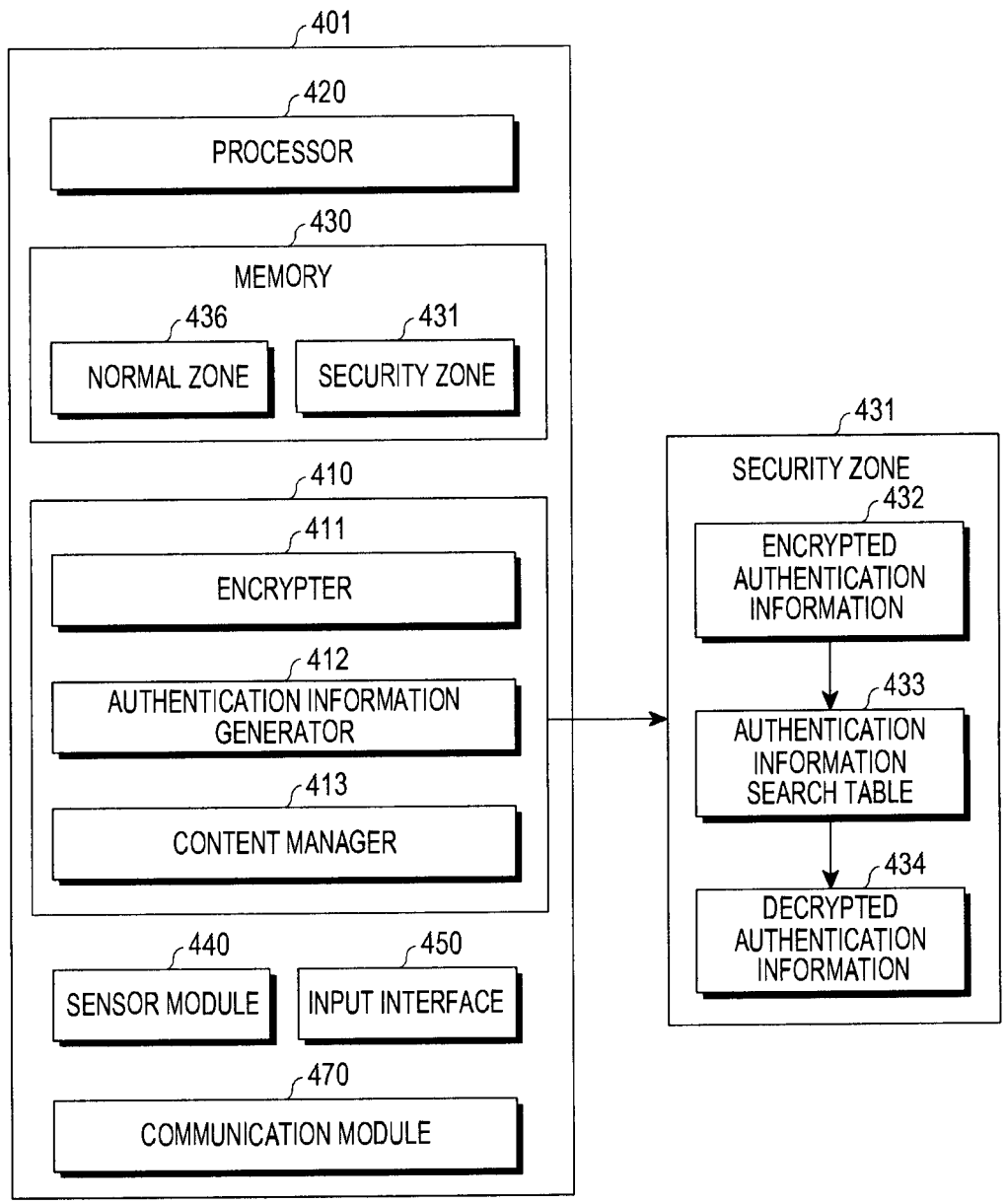
FIG. 4 is a block diagram of a first electronic device according to various embodiments of the present disclosure.
Figure 5:
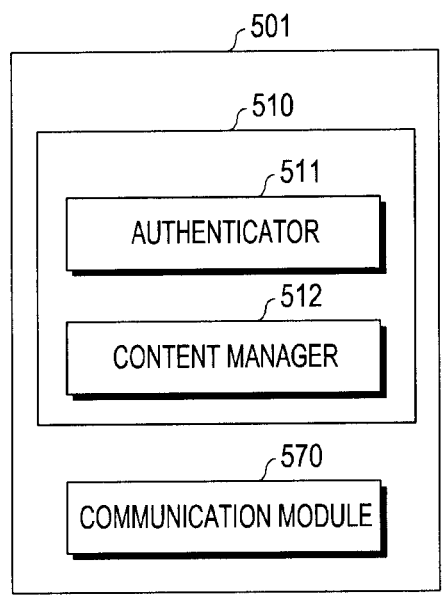
FIG. 5 is a block diagram of a second electronic device according to various embodiments of the present disclosure.

FIG. 4 is a block diagram of a first electronic device according to various embodiments of the present disclosure, and FIG. 5 is a block diagram of a second electronic device according to various embodiments of the present disclosure. According to an embodiment, a first electronic device 401 and a second electronic device 501 may include the whole electronic device 101 of FIG. 1 or a part thereof or the whole electronic device 201 of FIG. 2 or a part thereof.

Referring to FIG. 4, the first electronic device 401 may include an authentication module 410, a processor 420, a memory 430, a sensor module 440, an input interface 450, and a communication module 470. The first electronic device 401 may include a portable terminal such as smartphone, a tablet PC, a PDA, a PMP, an MP3 player, a wearable device, or the like.

According to various embodiments, the authentication module 410 may include a programming module stored in the memory 430 and configured to be executed by the processor 420. The authentication module 410 may be, for example, one type of the application program 147 illustrated in FIG. 1. At least a part of the authentication module 410 may be executed by software, firmware, hardware (e.g., the processor 120 of FIG. 1), or a combination of two or more of them, and may include, for example, modules, programs, routines, sets of instructions, or processes for performing one or more functions.

Once obtaining an authentication request related to the second electronic device 501, the authentication module 410 may transmit authentication information stored in the memory 430 to the second electronic device 501, based on at least a part of the authentication request. The authentication module 410 may be installed as a built-in type in the first electronic device 401 or may be downloaded by a user from an external server and installed in the first electronic device 401. According to various embodiments, the authentication module 410 may include or be connected to at least one of an encrypter 411, an authentication information generator 412, and a content manager 413.

The encrypter 411 may manage the authentication information stored in the memory 430 to perform authentication related to the second electronic device 501. The memory 430 may be divided into a security zone 431 and a normal zone 436. Authentication information stored in the security zone 431 of the memory 430 may be encrypted and stored. The encrypter 411 may decrypt encrypted authentication information stored in the security zone 431 of the memory 430. Once obtaining an authentication request related to the second electronic device 501, the authentication module 411 may search for encrypted authentication information 432 stored in the security zone 431 of the memory 430 by using an authentication information search table 433, based on at least a part of the authentication request. The encrypter 411 may decrypt the encrypted authentication information 432 found using the authentication information search table 433. The encrypter 411 may transmit decrypted authentication information 434 to the second electronic device 501. The encrypter 411 may store and manage the encrypted authentication information 432 stored in the security zone 431 of the memory 430, the authentication information search table 433, and the decrypted authentication information 434, decrypt the encrypted authentication information 432 into the decrypted authentication information 434, and encrypt the decrypted authentication information 434 back into the encrypted authentication information 432 or encrypt the decrypted authentication information 434 using another encryption scheme. The encrypter 411 may receive information about authentication related to the second electronic device 501 and search for the encrypted authentication information 432 stored in the security zone 431 of the memory 430 by using an authentication information search table 433, based on the received information. The authentication information search table 433 may be a hash table.

The authentication information generator 412 may generate authentication information to perform authentication related to the second electronic device 501 and store the generated authentication information in the memory 430. When the authentication request related to the second electronic device 501 is intended to release function restriction of the second electronic device 501 or to add a function to the second electronic device 501 and the authentication request is the authentication request obtained first, then the authentication information generator 412 may obtain a user input for performing authentication related to the second electronic device 501, and may generate authentication information related to the second electronic device 501 in the case that the user input satisfies a designated condition. For example, in case of authentication related to door unlock, the authentication information generator 412 may obtain a password for the door unlock by using the input interface 450, and generate authentication information corresponding to the door unlock based on the obtained password. When the authentication request related to the second electronic device 501 is intended to log in to a website connected to the second electronic device 501 and the authentication request is the authentication request obtained first, then the authentication information generator 412 may connect to the website using the input interface 450 of the first electronic device 401, obtain an identification (ID) and a password for logging in to the connected website, and generate authentication information corresponding to the website based on the obtained ID and password. The authentication information generator 412 may deliver the generated authentication information to the encrypter 411 which may then encrypt the authentication information and store in the authentication information search table 433, the encrypted authentication information 432 in association with authentication corresponding to the encrypted authentication information 432. That is, the authentication information may include at least one of an ID and a password for login to the website connected to the second electronic device 501, a password for releasing function restriction of the second electronic device 501, and a password for adding a function to the second electronic device 501. The authentication information may include first authentication information and second authentication information in which the first authentication information may include an ID and a password for logging in to a first website and the second authentication information may include an ID and a password for logging in to a second website. N or more authentication information may be included, each of which may include an ID and a password for logging in a different website.

The content manager 413 may receive information about authentication related to the second electronic device 501 by using the communication module 470 to perform authentication related to the second electronic device 501, and transmit authentication information related to the second electronic device 501.

According to various embodiments, the processor 420 may include, for example, the entire processor 120 illustrated in FIG. 1 or a part thereof. The processor 420 may include one or more of a CPU, an AP, and a CP. The processor 420 may process at least a part of information obtained from other elements (e.g., the authentication module 410, the memory 430, the sensor module 440, the input interface 450, and the communication module 470) of the first electronic device 401 and provide the same to the user in various ways.

According to various embodiments, the memory 430 may include, for example, the whole processor 130 illustrated in FIG. 1 or a part thereof. In the memory 430, instructions or data related to at least one other elements of the first electronic device 401 may be stored. In the memory 430, signals or data input/output corresponding to operations of the authentication module 410, the processor 420, the sensor module 440, the input interface 450, and the communication module 470, under control of the processor 420 may be stored. In the memory 430, a control program and applications for control of the first electronic device 401 or the processor 420 may be stored. In the memory 430, the authentication module 410 including the encrypter 411, the authentication information generator 412, and the content manager 413 may be stored. The memory 430 may be divided into the security zone 431 and the normal zone 436. The authentication information may be stored in the security zone 431 of the memory 430. The authentication information stored in the security zone 431 of the memory 430 may be encrypted and stored. In the security zone 431 of the memory 430, the encrypted authentication information 432, the authentication information search table 433, and the decrypted authentication information 434 may be stored.

According to various embodiments, the sensor module 440 may include, for example, the whole sensor module 240 illustrated in FIG. 2 or a part thereof. The sensor module 440 may obtain user biometric information to perform authentication related to the second electronic device 501. For example, the sensor module 440 may include a finger print sensor capable of obtaining the user biometric information, a camera for recognizing a user's iris or face, a microphone for recognizing a user's voice, or a heart rate monitor (HRM). The sensor module 440 may obtain the user biometric information for authentication related to the second electronic device 501 and enable authentication related to the second electronic device 501 to be performed in the case that the user biometric information satisfies a designated condition. For example, according to whether a fingerprint, an iris, a face, a voice, a heart rate, etc., of the user biometric information obtained using the sensor module 440 corresponds to information previously stored in the first electronic device 401, the sensor module 440 may enable authentication related to the second electronic device 501 to be performed or disable the authentication from being performed.

According to various embodiments, the input interface 450 may include, for example, the whole I/O interface 150 illustrated in FIG. 1 or a part thereof. The input interface 450 may include a touch panel 252, a (digital) pen sensor 254, a key 256, or an ultrasonic input device 258. The input interface 450 may obtain a user input to perform authentication related to the second electronic device 501 and enable authentication related to the second electronic device 501 to be performed in the case that the user input satisfies a designated condition. For example, according to whether a user's touch gesture, an ID, a password, etc., obtained using the input interface 450 corresponds to information previously stored in the first electronic device 401, the input interface 450 may enable authentication related to the second electronic device 501 to be performed or disable the authentication from being performed.

According to various embodiments, the communication module 470 may include, for example, the whole communication interface 170 illustrated in FIG. 1 or a part thereof. The communication module 470 may connect the first electronic device 401 with the second electronic device 501. The communication module 470 may support wireless communication or wired communication. For example, the wireless communication may include at least one of Wireless Fidelity (WiFi), Bluetooth, Bluetooth Low Energy (BLE), Zigbee, near field communication (NFC), magnetic secure transmission (MST), radio frequency (RF), or a body area network (BAN). The wireless communication may include cellular communication using at least one of Long-Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM). The wired communication may include at least one of USB, RS-232, power line communication, POTS, or the like. The communication module 470 may be of a wired communication type for connection between the first electronic device 401 and the second electronic device 501. For example, a wireless charging dock or a cable like a USB cable, etc., may be used. The communication module 470 may be of a wireless communication type for connection between the first electronic device 401 and the second electronic device 501. For example, ultra-short range wireless connection such as NFC, MST, radio frequency identification (RFID), etc., or short-range wireless connection such as Bluetooth, WiFi, etc., may be used. The communication module 470 may connect the first electronic device 401 with a wearable electronic device. The communication module 470 may receive a signal for authentication related to the second electronic device 501 from the wearable electronic device.

Referring to FIG. 5, the second electronic device 501 may at least include an authentication module 510 and a communication module 570. The second electronic device 501 may include home appliances such as a desktop PC, a laptop PC, a netbook computer, a smart TV, a smart door, a smart refrigerator, a smart air-conditioner, a smart washing machine, etc.

According to various embodiments, the authentication module 510 may include a programming module stored in a memory (e.g., the memory 130 of FIG. 1) and configured to be executed by a processor (e.g., the processor 120 of FIG. 1). The authentication module 510 may include all of components corresponding to those included in the authentication module 410 of FIG. 4 or some of them. The authentication module 510 may be installed as a built-in type in the second electronic device 501 or may be downloaded by the user from an external server and installed in the second electronic device 501. The authentication module 501 may include or be connected to at least one of an authenticator 511 and a content manager 512.

The authenticator 511 may transmit information about authentication related to the second electronic device 501 to the first electronic device 501 to perform authentication related to the second electronic device 501 and perform authentication related to the second electronic device 501 by using authentication information related to the second electronic device 501 received from the first electronic device 401 in response to the information about the authentication. The information about authentication related to the second electronic device 501 may include information for identifying the second electronic device 501 or information for identifying a website connected to the second electronic device 501.

The content manager 512 may transmit information about authentication related to the second electronic device 501 by using the communication module 570 to perform authentication related to the second electronic device 501, and receive authentication information related to the second electronic device 501.

According to various embodiments, the communication module 570 may include, for example, the whole communication interface 170 illustrated in FIG. 1 or a part thereof. The communication module 570 may connect the first electronic device 401 with the second electronic device 501. The communication module 570 may support wireless communication or wired communication.

Figure 6:
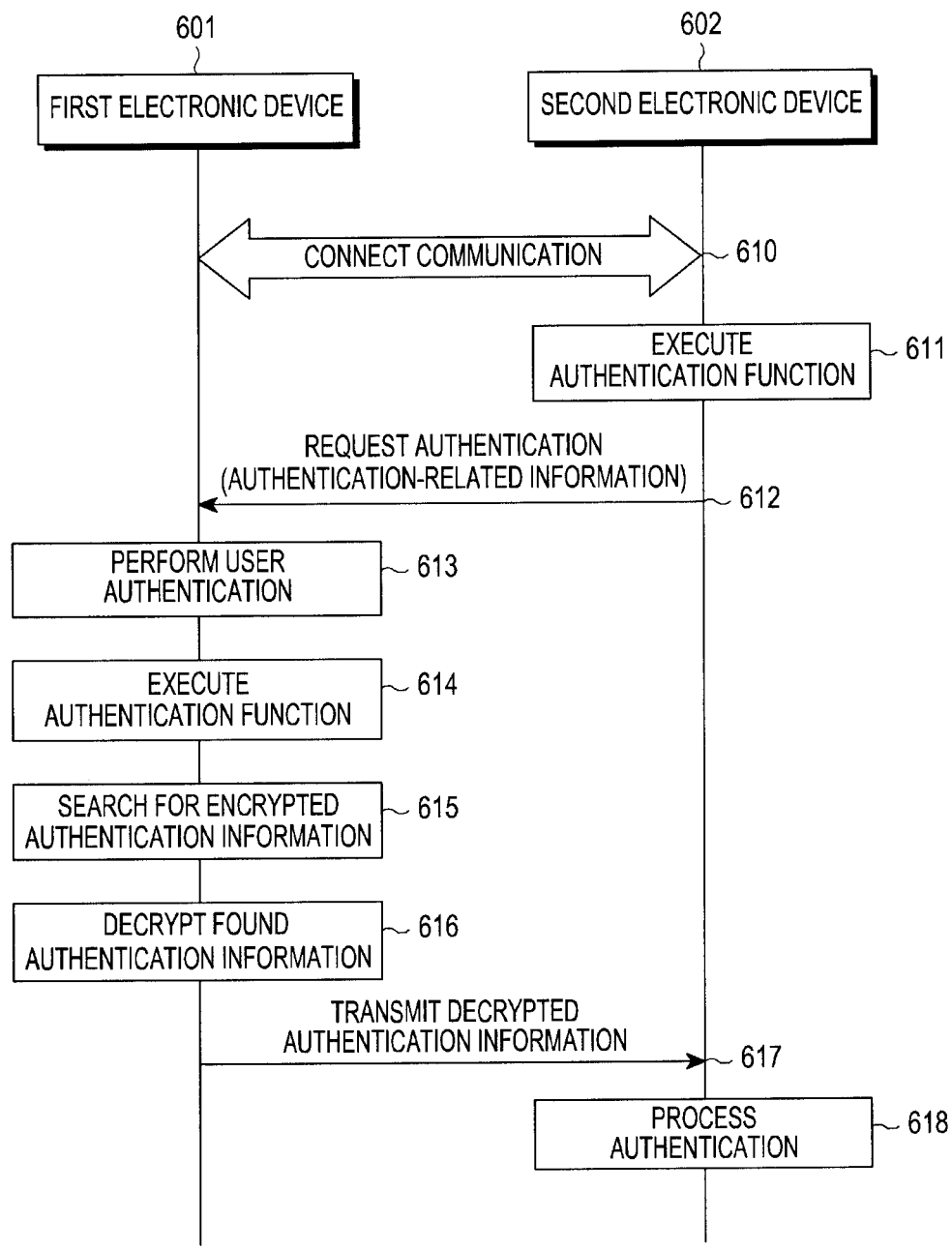
FIG. 6 is a view for describing operations of a first electronic device and a second electronic device according to various embodiments of the present disclosure.

FIG. 6 is a view for describing operations of a first electronic device and a second electronic device according to various embodiments of the present disclosure.

Referring to FIG. 6, in operation 610, a first electronic device 601 (e.g., a portable terminal) may connect communication with a second electronic device 602 (e.g., a PC, a smart door, a smart home appliance, etc.) to perform authentication related to the second electronic device 602.

In operation 611, the second electronic device 602 may execute an authentication function for performing authentication related to the second electronic device 602. For example, the second electronic device 602 may obtain authentication information including an ID and a password for logging in to the connected website and execute an authentication function for logging in to the website by using the obtained authentication information.

In operation 612, the second electronic device 602 may transmit information about authentication related to the second electronic device 602 to the first electronic device 601. The second electronic device 602 may request authentication related to the second electronic device 602 by transmitting the authentication-related information to the first electronic device 601. The authentication-related information may include the information for identifying the second electronic device 602 or the information for identifying the website connected to the second electronic device 602.

In operation 613, upon receiving the authentication request related to the second electronic device 602 from the second electronic device 602, the first electronic device 601 may perform user authentication regarding whether to perform authentication corresponding to the authentication request. The first electronic device 601 may obtain a user input by using an input interface (e.g., the input interface 450 of FIG. 4). The first electronic device 601 may obtain user biometric information by using a sensor module (e.g., the sensor module 440 of FIG. 4). The first electronic device 601 may obtain a signal from a wearable electronic device by using a communication module (e.g., the communication module 470 of FIG. 4).

In operation 614, the first electronic device 601 may identify whether the obtained user input, user biometric information or signal satisfies a designated condition, and execute an authentication function to perform authentication related to the second electronic device 602 in the case that the designated condition is satisfied.

In operation 615, the first electronic device 601 may search for encrypted authentication information stored in a security zone (e.g., the security zone 431 of FIG. 4) of a memory (e.g., the memory 430 of FIG. 4), based on the authentication-related information received from the second electronic device 602.

In operation 616, the first electronic device 601 may decrypt found encrypted authentication information.

In operation 617, the first electronic device 601 may transmit decrypted authentication information to the second electronic device 602.

In operation 618, the second electronic device 602 may process authentication related to the second electronic device 602 by using the decrypted authentication information received from the first electronic device 601.

Figure 7:
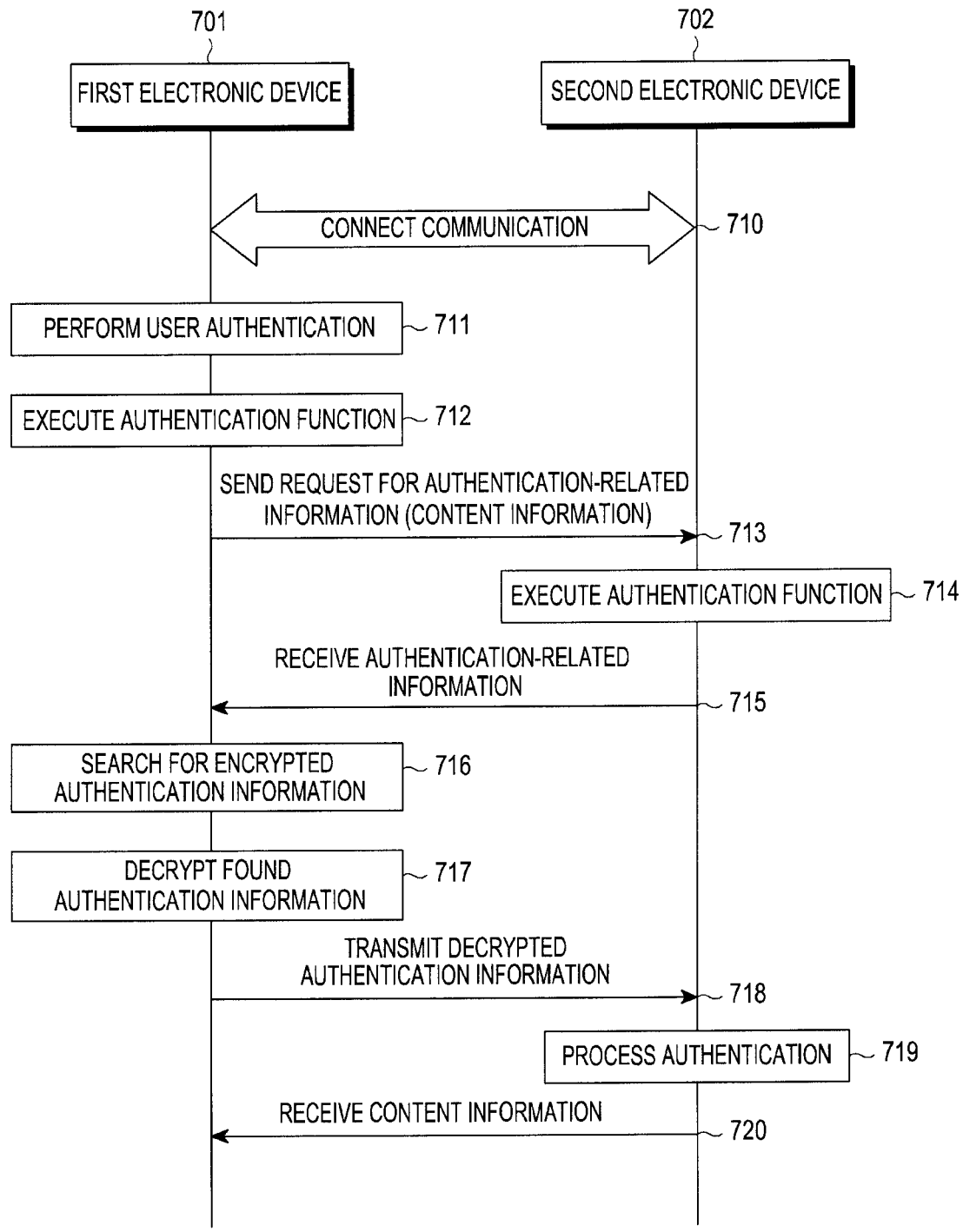
FIG. 7 is a view for describing operations of a first electronic device and a second electronic device according to various embodiments of the present disclosure.

FIG. 7 is a view for describing operations of a first electronic device and a second electronic device according to various embodiments of the present disclosure.

Referring to FIG. 7, in operation 710, a first electronic device 701 (e.g., a portable terminal) may connect communication with a second electronic device 702 (e.g., a PC, a smart door, a smart home appliance, etc.) to perform authentication related to the second electronic device 602.

In operation 711, the first electronic device 701 may perform user authentication to perform authentication related to the second electronic device 702. The first electronic device 701 may obtain a user input by using an input interface (e.g., the input interface 450 of FIG. 4). The first electronic device 601 may obtain user biometric information by using a sensor module (e.g., the sensor module 440 of FIG. 4). The first electronic device 601 may obtain a signal from a wearable electronic device by using a communication module (e.g., the communication module 470 of FIG. 4).

In operation 712, the first electronic device 701 may identify whether the obtained user input, user biometric information or signal satisfies a designated condition, and execute an authentication function to perform authentication related to the second electronic device 702 in the case that the designated condition is satisfied.

In operation 713, the first electronic device 701 may send a request for information about authentication related to the second electronic device 702 to the second electronic device 702 to perform authentication related to the second electronic device 702. The first electronic device 701 may send a request for content information of the second electronic device 702 corresponding to authentication processing of the second electronic device 702. The content information of the second electronic device 702 may include, for example, information such as a list of excessive/deficient food based on comparison between a list of food stored in a smart refrigerator and a list of food set by the user in the case that the second electronic device 702 is the smart refrigerator.

In operation 714, upon receiving the request for the authentication-related information, the second electronic device 702 may execute an authentication function for performing authentication related to the second electronic device 602.

In operation 715, the first electronic device 701 may receive the authentication-related information from the second electronic device 702 in response to the request for the authentication-related information. The information about authentication related to the second electronic device 701 may include information for identifying the second electronic device 701 or information for identifying a website connected to the second electronic device 501.

In operation 716, the first electronic device 701 may search for encrypted authentication information stored in a security zone (e.g., the security zone 431 of FIG. 4) of a memory (e.g., the memory 430 of FIG. 4), based on the authentication-related information received from the second electronic device 702.

In operation 717, the first electronic device 701 may decrypt found encrypted authentication information.

In operation 718, the first electronic device 701 may transmit decrypted authentication information to the second electronic device 702.

In operation 719, the second electronic device 702 may process authentication related to the second electronic device 702 by using the decrypted authentication information received from the first electronic device 701.

In operation 720, the first electronic device 701 may receive the content information of the second electronic device 702 corresponding to authentication processing of the second electronic device 702.

Figure 8:
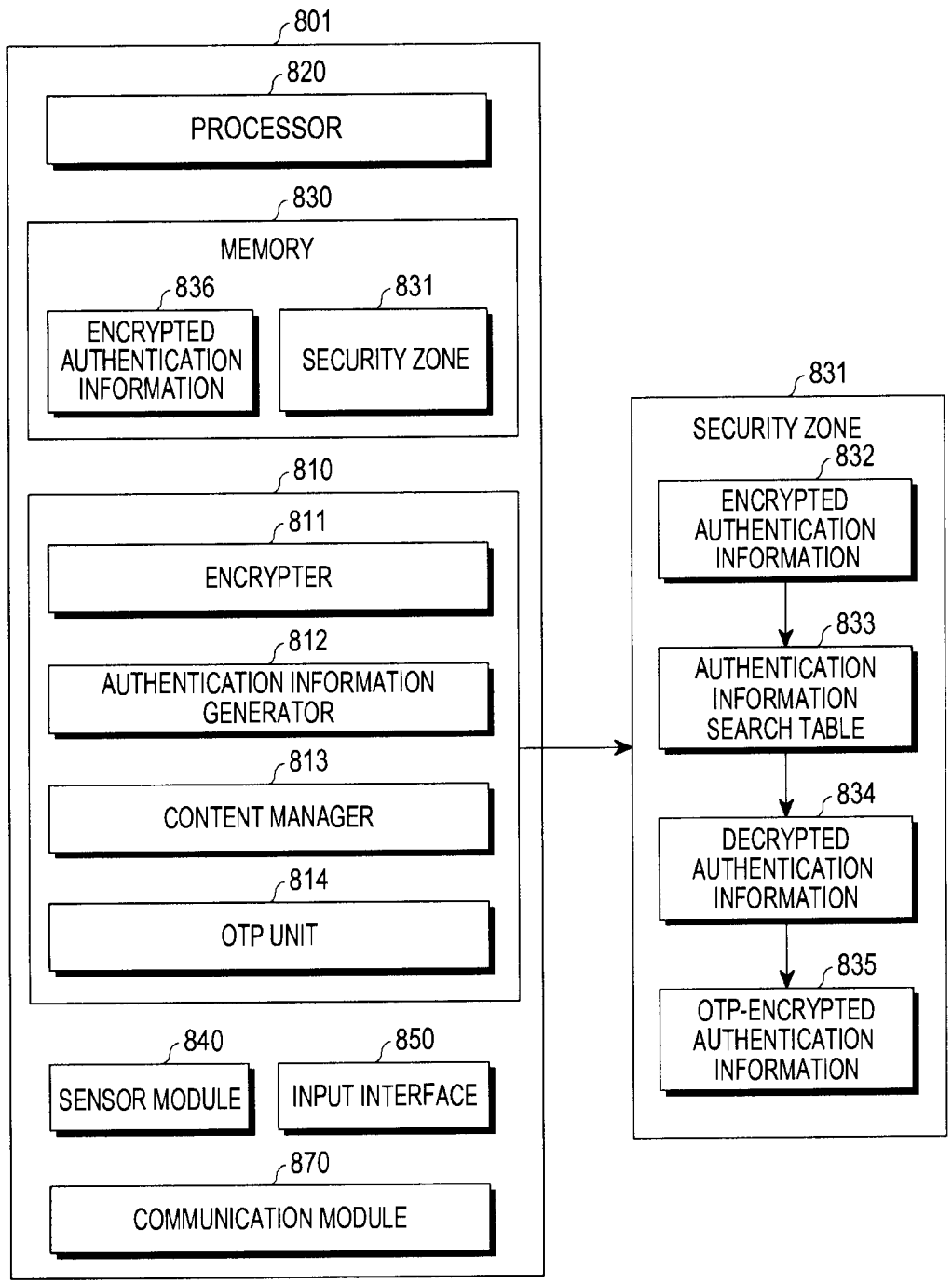
FIG. 8 is a block diagram of a first electronic device according to various embodiments of the present disclosure.
Figure 9:
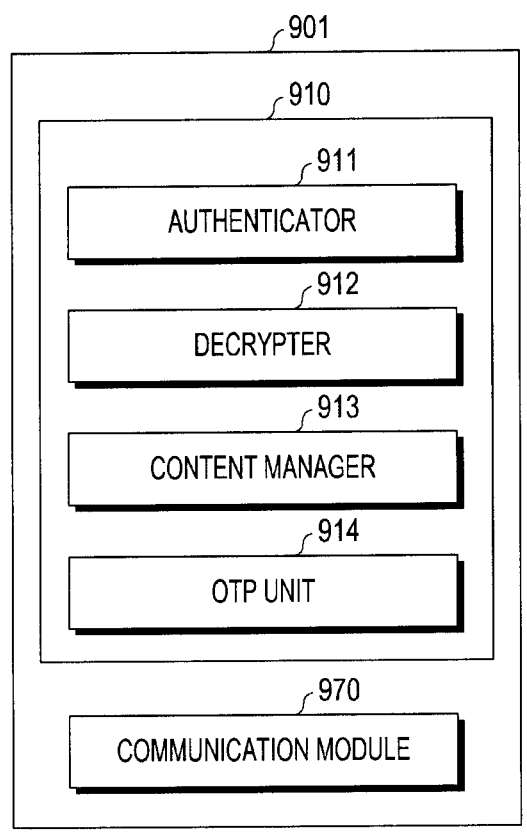
FIG. 9 is a block diagram of a second electronic device according to various embodiments of the present disclosure.

FIG. 8 is a block diagram of a first electronic device according to various embodiments of the present disclosure, and FIG. 9 is a block diagram of a second electronic device according to various embodiments of the present disclosure. According to an embodiment, a first electronic device 801 and a second electronic device 901 may include the whole electronic device 101 of FIG. 1 or a part thereof or the whole electronic device 201 of FIG. 2 or a part thereof.

Referring to FIGS. 8 and 9, except for further including components for one-time password (OTP) encryption and decryption, the first electronic device 801 and the second electronic device 901 are substantially identical to the first electronic device 401 illustrated in FIG. 4 and the second electronic device 501 illustrated in FIG. 5.

The first electronic device 801 may include an authentication module 810, a processor 820, a memory 830, a sensor module 840, an input interface 850, and a communication module 870. The first electronic device 801 may include a portable terminal such as smartphone, a tablet PC, a PDA, a PMP, an MP3 player, a wearable device, or the like.

According to various embodiments, the authentication module 810 may include or be connected to at least one of an encrypter 811, an authentication information generator 812, a content manager 813, and an OTP unit 814. The encrypter 811, the authentication information generator 812, and the content manager 813 of the authentication module 810 may be similar with or correspond to the encrypter 411, the authentication information generator 412, and the content manager 413 of FIG. 4.

The OTP unit 814 may send a request for OTP encryption information corresponding to a unique ID of the first electronic device 801 to an external authentication server by using the communication module 870. The OTP unit 814 may receive the OTP encryption information from the external authentication server in response to the request. The OTP unit 814 may deliver the OTP encryption information to the encrypter 811. The encrypter 811 may obtain encrypted authentication information 832 stored in a security zone 831 of the memory 830 by using an authentication information search table 833, and decrypt the obtained encrypted authentication information 832. The encrypter 811 may encrypt decrypted authentication information 834 by using an OTP scheme, based on the OTP encryption information delivered from the OTP unit 814. The first electronic device 801 may transmit OTP-encrypted authentication information 835 as authentication information for authentication related to the second electronic device 901. The OTP encryption information may include an OTP password generated based on an encryption system that is temporarily or periodically changed in the external authentication server. The OTP encryption information may include a unique ID of the first electronic device 801. The OTP encryption information may include an OTP ID generated based on an encryption system that is temporarily or periodically changed in the external authentication server.

The second electronic device 901 may at least include an authentication module 910 and a communication module 970. The second electronic device 901 may include home appliances such as a desktop PC, a laptop PC, a netbook computer, a smart TV, a smart door, a smart refrigerator, a smart air-conditioner, a smart washing machine, etc.

According to various embodiments, the authentication module 910 may include a programming module stored in a memory (e.g., the memory 130 of FIG. 1) and configured to be executed by a processor (e.g., the processor 120 of FIG. 1). The authentication module 910 may include all of components corresponding to those included in the authentication module 810 of FIG. 8 or some of them. The authentication module 910 may include or be connected to at least one of an authenticator 911, a decrypter 912, a content manager 913, and an OTP unit 914. The authenticator 911 and the content manager 913 of the authentication module 910 may be similar with or correspond to the authenticator 511 and the content manager 512 of the authentication module 510 of FIG. 5.

The authenticator 911 may transmit information about authentication related to the second electronic device 901 to the first electronic device 801 to perform authentication related to the second electronic device 901 and perform authentication related to the second electronic device 901 by using authentication information related to the second electronic device 901 received from the first electronic device 801 in response to the information about the authentication. The information about authentication related to the second electronic device 901 may include information for identifying the second electronic device 901 or information for identifying a website connected to the second electronic device 901. The authentication information received from the first electronic device 801 may be the OTP-encrypted authentication information encrypted using the OTP scheme. The second electronic device 901 may receive the OTP encryption information from the first electronic device 801. The OTP encryption information received from the first electronic device 801 may be a unique ID of the first electronic device 801 or an OTP ID generated according to an encryption system that is temporarily or periodically changed in an external authentication server.

The decrypter 912 may transmit the unique ID of the first electronic device 801 included in the OTP encryption information received from the first electronic device 801 to the external authentication server and send a request for an OTP password corresponding to the unique ID to the external authentication server. The decrypter 912 may transmit the OTP ID included in the OTP encryption information received from the first electronic device 801 to the external authentication server and send a request for an OTP password corresponding to the OTP ID to the external authentication server. The decrypter 912 may receive the OTP password from the external authentication server. The decrypter 912 may decrypt the OTP-encrypted authentication information received from the first electronic device 801, based on the unique ID or OTP ID received from the first electronic device 801 and the OTP password received from the external authentication server. The decrypter 912 may perform authentication related to the second electronic device 901 by delivering the decrypted authentication information to the authenticator 911.

The OTP unit 914 may transmit the unique ID or OTP ID received from the first electronic device 801 to the external authentication server and send a request for the OTP password corresponding to the unique ID or OTP ID to the external authentication server, by using the communication module 970. The OTP unit 914 may receive the OTP password from the authentication server in response to the request. The OTP unit 914 may deliver the OTP password to the decrypter 912.

Figure 10:
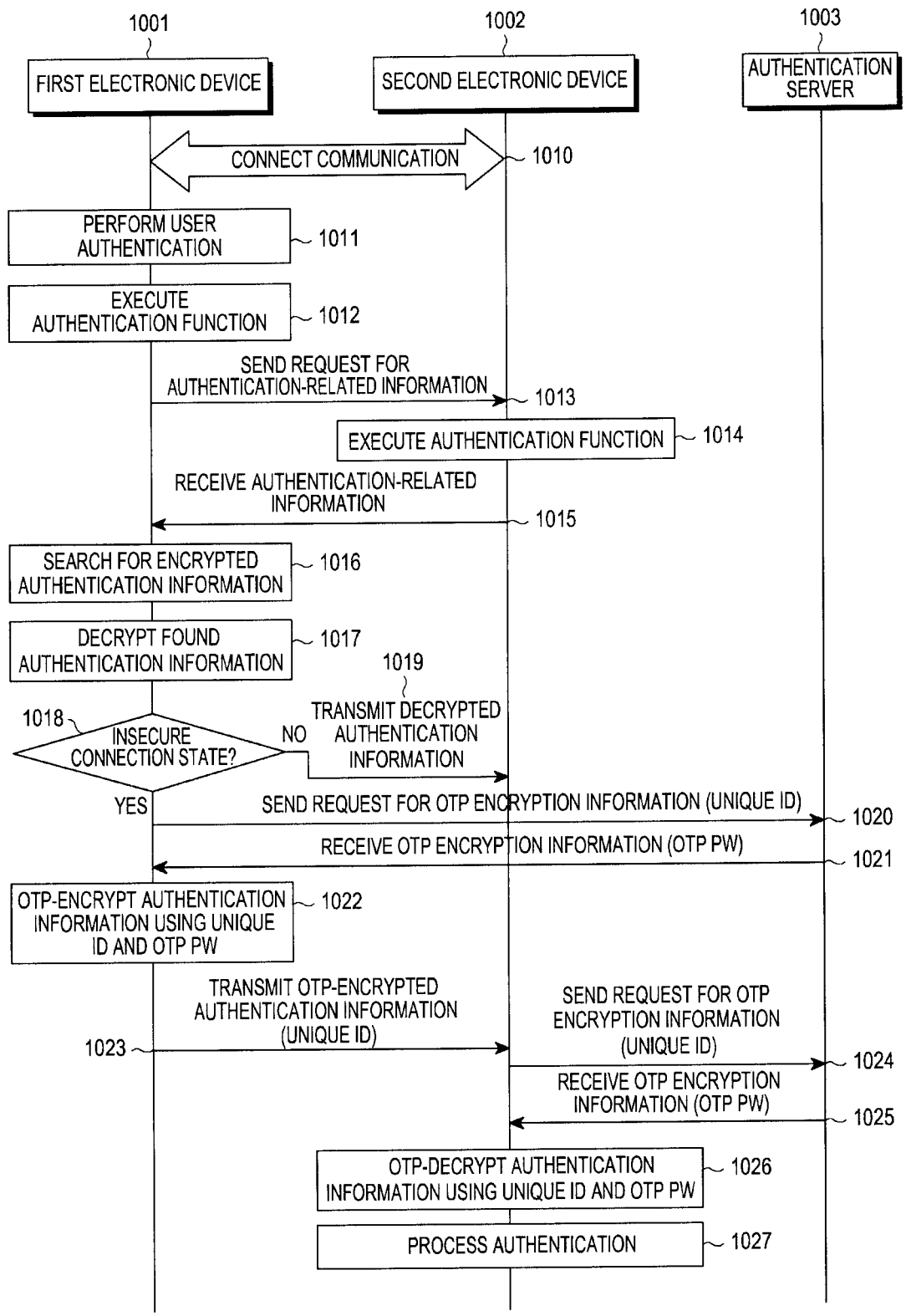
FIG. 10 is a view for describing operations of a first electronic device, a second electronic device, and an authentication server according to various embodiments of the present disclosure.

FIG. 10 is a view for describing operations of a first electronic device and a second electronic device according to various embodiments of the present disclosure.

Referring to FIG. 10, in operation 1010, a first electronic device 1001 (e.g., a portable terminal) may connect communication with a second electronic device 1002 (e.g., a PC, a smart door, a smart home appliance, etc.) to perform authentication related to the second electronic device 1002.

In operation 1011, the first electronic device 1001 may perform user authentication to perform authentication related to the second electronic device 1002. The first electronic device 1001 may obtain a user input by using an input interface (e.g., the input interface 450 of FIG. 4). The first electronic device 1001 may obtain user biometric information by using a sensor module (e.g., the sensor module 440 of FIG. 4). The first electronic device 1001 may obtain a signal from a wearable electronic device by using a communication module (e.g., the communication module 470 of FIG. 4).

In operation 1012, the first electronic device 1001 may identify whether the obtained user input, user biometric information or signal satisfies a designated condition, and execute an authentication function to perform authentication related to the second electronic device 1002 in the case that the designated condition is satisfied.

In operation 1013, the first electronic device 1001 may send a request for information about authentication related to the second electronic device 1002 to the second electronic device 1002 to perform authentication related to the second electronic device 1002.

In operation 1014, upon receiving the request for the authentication-related information, the second electronic device 1002 may execute an authentication function for performing authentication related to the second electronic device 1002.

In operation 1015, the first electronic device 1001 may receive the authentication-related information from the second electronic device 1002 in response to the request for the authentication-related information. The information about authentication related to the second electronic device 1001 may include information for identifying the second electronic device 1001 or information for identifying a website connected to the second electronic device 1001.

In operation 1016, the first electronic device 1001 may search for encrypted authentication information stored in a security zone (e.g., the security zone 431 of FIG. 4) of a memory (e.g., the memory 430 of FIG. 4), based on the authentication-related information received from the second electronic device 1002.

In operation 1017, the first electronic device 1001 may decrypt found encrypted authentication information.

In operation 1018, the first electronic device 1001 may identify a connection state between the first electronic device 1001 and the second electronic device 1002. The first electronic device 1001 may perform authentication related to the second electronic device 1002 in the case that the identified connection state satisfies a designated condition. The designated condition regarding the connection state may include identification of a possibility of hacking via a wired or wireless network. For example, the connection state may be used to identify a possibility that an electronic device other than the first electronic device 1001 and the second electronic device 1002 that are connected via a wired or wireless network may intervene. When the connection state indicates a low possibility that an electronic device other than the first electronic device 1001 and the second electronic device 1002 may be connected, then the connection state may be identified as a secure state. On the other hand, when the connection state indicates a high possibility that an electronic device other than the first electronic device 1001 and the second electronic device 1002 may be connected, then the connection state may be identified as an insecure state.

When identifying the connection state as the secure state in operation 1018, the first electronic device 1001 may transmit the decrypted authentication information to the second electronic device 1002 in operation 1019.

When identifying the connection state as the insecure state in operation 1018, the first electronic device 1001 may send a request for OTP encryption information corresponding to a unique ID of the first electronic device 1001 to the authentication server 1003 in operation 1020.

In operation 1021, the authentication server 1003 may generate an OTP password corresponding to the unique ID of the first electronic device 1001 and OTP encryption information including the OTP password to the first electronic device 1001.

In operation 1022, the first electronic device 1001 may encrypt authentication information using the OTP scheme by using the OTP password included in the OTP encryption information received from the authentication server 1003 and the unique ID of the first electronic device 1001.

In operation 1023, the first electronic device 1001 may transmit the OTP-encrypted authentication information and the unique ID of the first electronic device 1001 to the second electronic device 1002.

In operation 1024, the second electronic device 1002 may transmit the received unique ID of the first electronic device 1001 to the authentication server 1003 and send a request for an OTP password corresponding to the unique ID to the authentication server 1003.

In operation 1025, the second electronic device 1002 may receive the OTP password from the authentication server 1003.

In operation 1026, the second electronic device 1002 may decrypt the OTP-encrypted authentication information received from the first electronic device 1001, based on the unique ID received from the first electronic device 1001 and the OTP password received from the authentication server 1003.

In operation 1027, the second electronic device 1002 may process authentication related to the second electronic device 1002 by using the decrypted authentication information.

Figure 11:
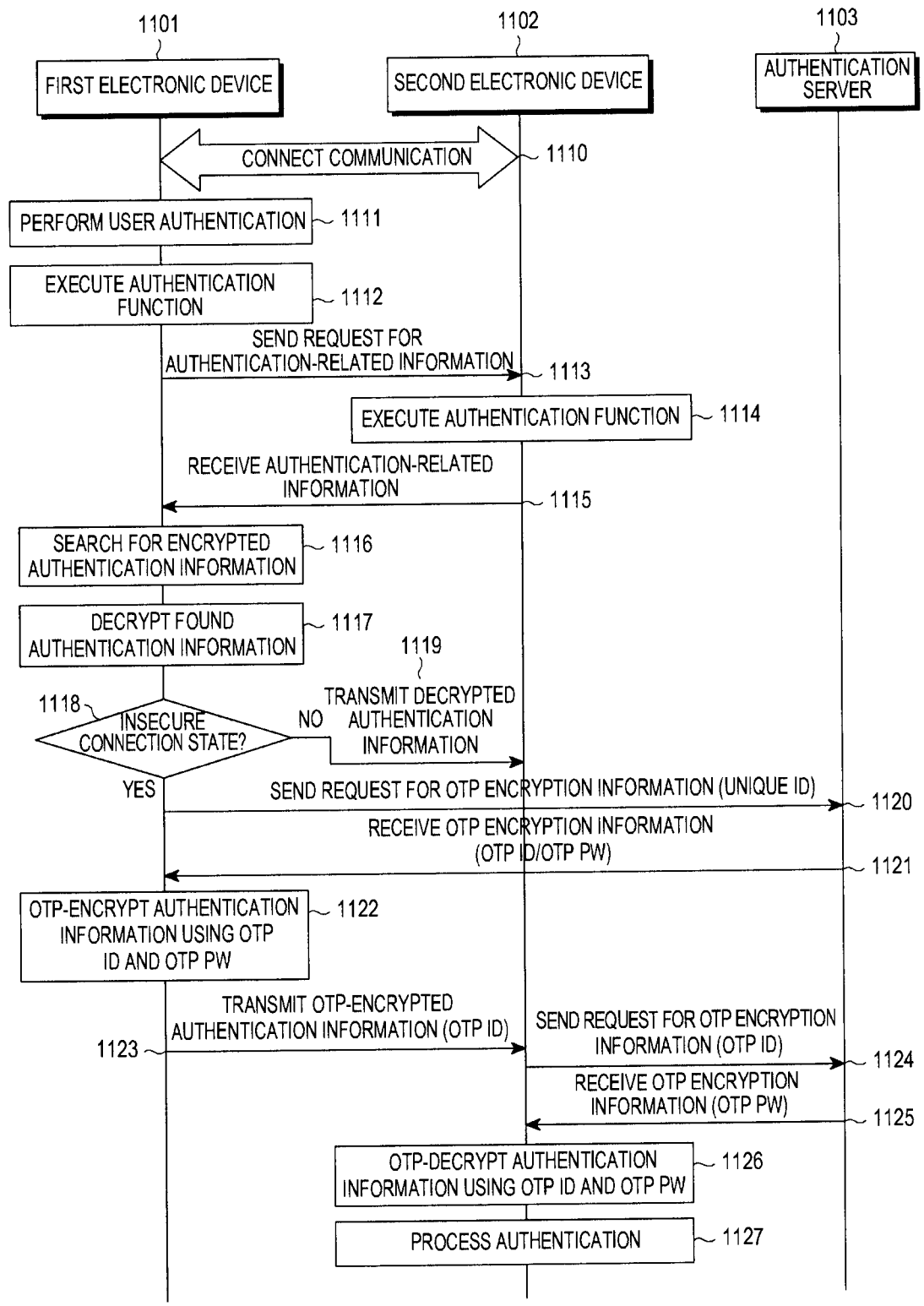
FIG. 11 is a view for describing operations of a first electronic device, a second electronic device, and an authentication server according to various embodiments of the present disclosure.

FIG. 11 is a view for describing operations of a first electronic device, a second electronic device, and an authentication server according to various embodiments of the present disclosure.

Referring to FIG. 11, in operation 1110, a first electronic device 1101 (e.g., a portable terminal) may connect communication with a second electronic device 1102 (e.g., a PC, a smart door, a smart home appliance, etc.) to perform authentication related to the second electronic device 1102.

In operation 1111, the first electronic device 1101 may perform user authentication to perform authentication related to the second electronic device 1102. The first electronic device 1101 may obtain a user input by using an input interface (e.g., the input interface 450 of FIG. 4). The first electronic device 1001 may obtain user biometric information by using a sensor module (e.g., the sensor module 440 of FIG. 4). The first electronic device 1101 may obtain a signal from a wearable electronic device by using a communication module (e.g., the communication module 470 of FIG. 4).

In operation 1112, the first electronic device 1101 may identify whether the obtained user input, user biometric information or signal satisfies a designated condition, and execute an authentication function to perform authentication related to the second electronic device 1102 in the case that the designated condition is satisfied.

In operation 1113, the first electronic device 1101 may send a request for information about authentication related to the second electronic device 1102 to the second electronic device 1102 to perform authentication related to the second electronic device 1102.

In operation 1114, upon receiving the request for the authentication-related information, the second electronic device 1102 may execute an authentication function for performing authentication related to the second electronic device 1102.

In operation 1115, the first electronic device 1101 may receive the authentication-related information from the second electronic device 1102 in response to the request for the authentication-related information. The information about authentication related to the second electronic device 1101 may include information for identifying the second electronic device 1101 or information for identifying a website connected to the second electronic device 1101.

In operation 1116, the first electronic device 1101 may search for encrypted authentication information stored in a security zone (e.g., the security zone 431 of FIG. 4) of a memory (e.g., the memory 430 of FIG. 4), based on the authentication-related information received from the second electronic device 1102.

In operation 1117, the first electronic device 1101 may decrypt found encrypted authentication information.

In operation 1118, the first electronic device 1101 may identify a connection state between the first electronic device 1101 and the second electronic device 1102. The first electronic device 1101 may perform authentication related to the second electronic device 1102 in the case that the identified connection state satisfies a designated condition. The designated condition regarding the connection state may include identification of a possibility of hacking via a wired or wireless network. For example, the connection state may be used to identify a possibility that an electronic device other than the first electronic device 1101 and the second electronic device 1102 that are connected via a wired or wireless network may intervene. When the connection state indicates a low possibility that an electronic device other than the first electronic device 1101 and the second electronic device 1102 may be connected, then the connection state may be identified as a secure state. On the other hand, when the connection state indicates a high possibility that an electronic device other than the first electronic device 1101 and the second electronic device 1102 may be connected, then the connection state may be identified as an insecure state.

When identifying the connection state as the secure state in operation 1118, the first electronic device 1101 may transmit the decrypted authentication information to the second electronic device 1102 in operation 1119.

When identifying the connection state as the insecure state in operation 1118, the first electronic device 1101 may send a request for OTP encryption information corresponding to a unique ID of the first electronic device 1101 to the authentication server 1103 in operation 1120.

In operation 1121, the authentication server 1103 may transmit to the first electronic device 1101, OTP encryption information including an OTP ID and an OTP password that are generated according to an encryption system temporarily or periodically changed for the unique ID of the first electronic device 1001. By changing the unique ID of the first electronic device 1101 into an OTP ID in the authentication server 1103, security may be further enhanced. Whether to change the unique ID into the OTP ID may be determined based on a request from the first electronic device 1101 or a result of a security test that may be carried out by the authentication server 1103.

In operation 1122, the first electronic device 1101 may encrypt authentication information using the OTP scheme by using the OTP ID and the OTP password included in the OTP encryption information received from the authentication server 1103.

In operation 1123, the first electronic device 1101 may transmit the OTP-encrypted authentication information and the OTP ID generated in the authentication server 1103 to the second electronic device 1102.

In operation 1124, the second electronic device 1102 may transmit the received OTP ID to the authentication server 1103 and send a request for an OTP password corresponding to the OTP ID to the authentication server 1003.

In operation 1125, the second electronic device 1102 may receive the OTP password from the authentication server 1103.

In operation 1126, the second electronic device 1102 may decrypt the OTP-encrypted authentication information received from the first electronic device 1101, based on the OTP ID received from the first electronic device 1101 and the OTP password received from the authentication server 1103.

In operation 1127, the second electronic device 1102 may process authentication related to the second electronic device 1102 by using the decrypted authentication information.

Figure 12:
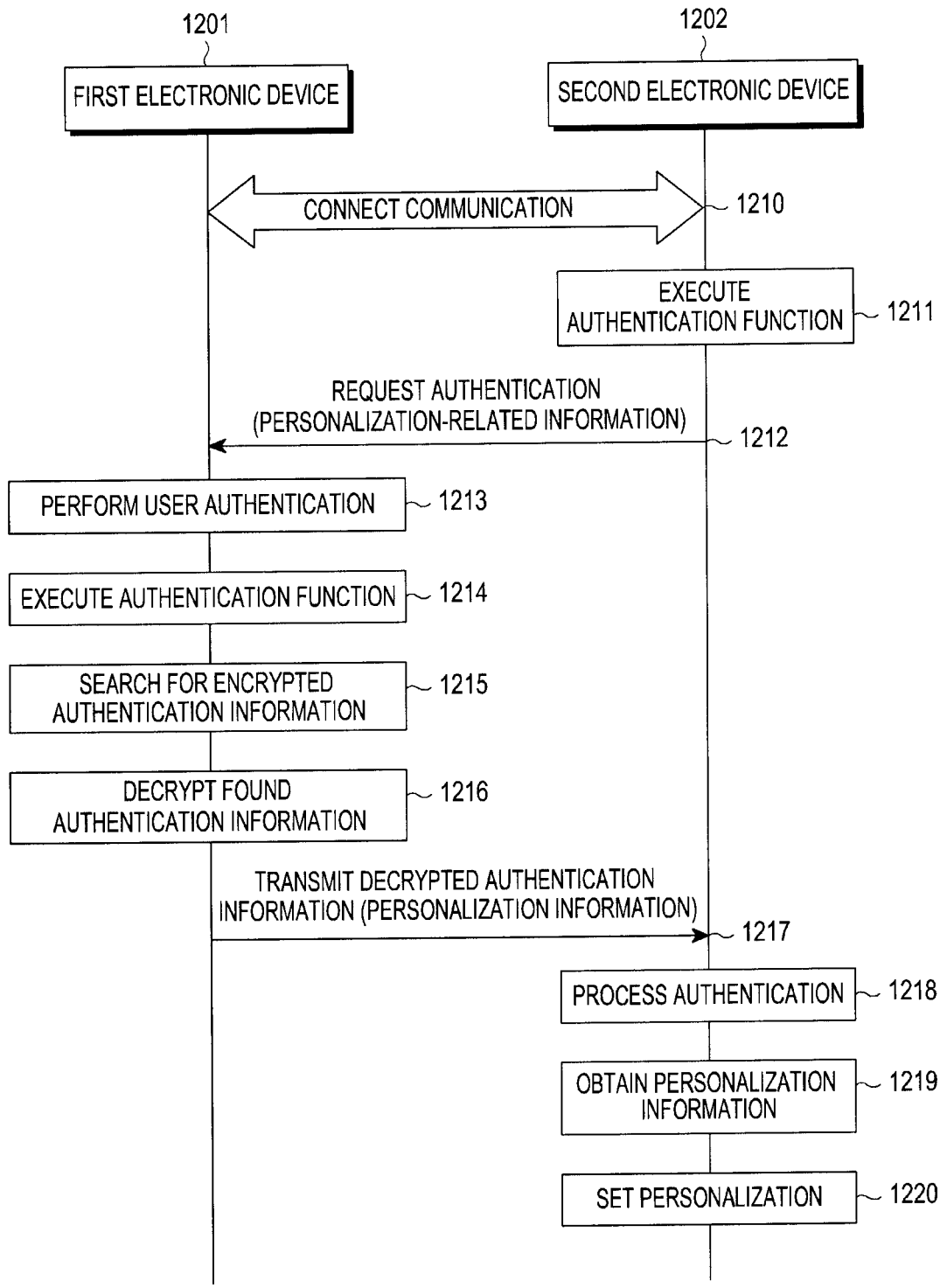
FIG. 12 is a view for describing operations of a first electronic device and a second electronic device according to various embodiments of the present disclosure.

FIG. 12 is a view for describing operations of a first electronic device and a second electronic device according to various embodiments of the present disclosure.

Referring to FIG. 12, in operation 1210, a first electronic device 1201 (e.g., a portable terminal) may connect communication with a second electronic device 1202 (e.g., a PC, a smart door, a smart home appliance, etc.) to perform authentication related to the second electronic device 1202.

In operation 1211, the second electronic device 1202 may execute an authentication function for performing authentication related to the second electronic device 1202. For example, the second electronic device 1202 may execute an authentication function for setting personalization of the second electronic device 1202.

In operation 1212, the second electronic device 1202 may transmit information about authentication related to the second electronic device 1202 to the first electronic device 1201. The second electronic device 1202 may request authentication related to the second electronic device 1202 by transmitting the authentication-related information to the first electronic device 1201. The second electronic device 1202 may request setting of personalization of the second electronic device 1202. The authentication-related information may include the information for identifying the second electronic device 1202 or the information for identifying the website connected to the second electronic device 1202. Personalization-related information may be function information regarding setting of personalization of the second electronic device 1202.

In operation 1213, upon receiving the authentication request related to the second electronic device 1202 from the second electronic device 1202, the first electronic device 1201 may perform user authentication regarding whether to perform authentication corresponding to the authentication request. The first electronic device 1201 may obtain a user input by using an input interface (e.g., the input interface 450 of FIG. 4). The first electronic device 1201 may obtain user biometric information by using a sensor module (e.g., the sensor module 440 of FIG. 4). The first electronic device 1201 may obtain a signal from a wearable electronic device by using a communication module (e.g., the communication module 470 of FIG. 4).

In operation 1214, the first electronic device 1201 may identify whether the obtained user input, user biometric information or signal satisfies a designated condition, and execute an authentication function to perform authentication related to the second electronic device 1202 in the case that the designated condition is satisfied.

In operation 1215, the first electronic device 1201 may search for encrypted authentication information stored in a security zone (e.g., the security zone 431 of FIG. 4) of a memory (e.g., the memory 430 of FIG. 4), based on the authentication-related information received from the second electronic device 1202. The first electronic device 1201 may search for personalization information stored in a normal zone (e.g., the normal zone 436 of FIG. 4) of a memory, based on the personalization-related information received from the second electronic device 1202.

In operation 1216, the first electronic device 1201 may decrypt found encrypted authentication information.

In operation 1217, the first electronic device 1201 may transmit decrypted authentication information and personalization setting information to the second electronic device 1202.

In operation 1218, the second electronic device 1202 may process authentication related to the second electronic device 1202 by using the decrypted authentication information received from the first electronic device 1201.

In operation 1219, the second electronic device 1202 may obtain the personalization setting information received from the first electronic device 1201 corresponding to authentication processing of the second electronic device 1201.

In operation 1220, the second electronic device 1202 may set personalization of the second electronic device 1202 by using the obtained personalization setting information.

Figure 13:
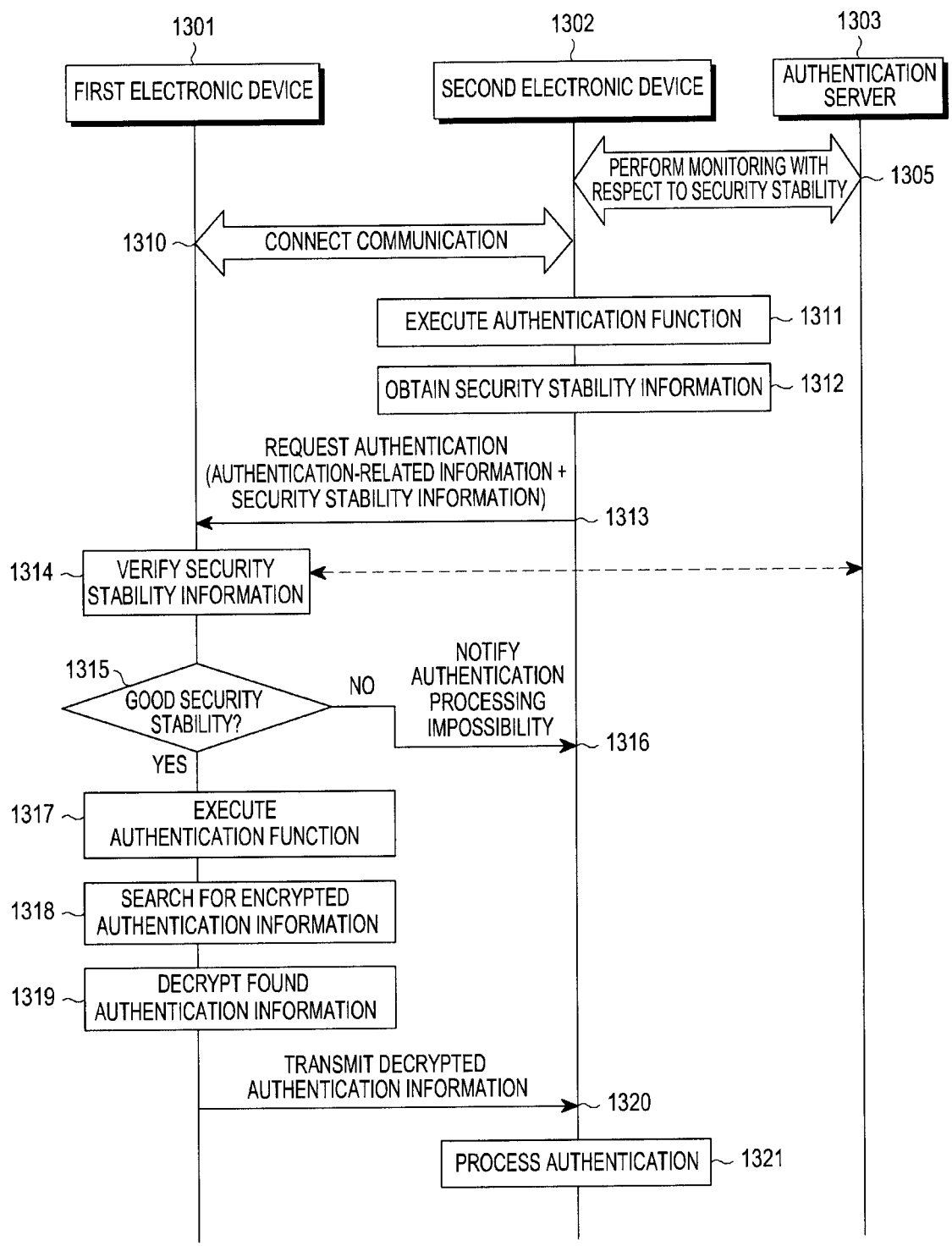
FIG. 13 is a view for describing operations of a first electronic device, a second electronic device, and an authentication server according to various embodiments of the present disclosure.

FIG. 13 is a view for describing operations of a first electronic device, a second electronic device, and an authentication server according to various embodiments of the present disclosure.

Referring to FIG. 13, in operation 1305, a second electronic device 1302 (e.g., a PC, a smart door, a smart home appliance, etc.) may perform monitoring with respect to security stability of the second electronic device 1302 by using the authentication server 1303. For example, the second electronic device 1302 may periodically identify security stability of the second electronic device 1302 by using the authentication server 1303. The authentication server 1303 may periodically identify security stability of the second electronic device 1302 and transmit information about security stability of the second electronic device 1302 to the second electronic device 1302. According to various embodiments, monitoring with respect to security stability may be performed for the first electronic device 1301. The information about the security stability may be encrypted or periodically changed by the authentication server 1303.

In operation 1310, a first electronic device 1301 (e.g., a portable terminal) may connect communication with a second electronic device 1302 to perform authentication related to the second electronic device 1302.

In operation 1311, the second electronic device 1302 may execute an authentication function for performing authentication related to the second electronic device 1302.

In operation 1312, the second electronic device 1302 may obtain information about the security stability of the second electronic device 1302 as a result of monitoring with respect to security stability using the authentication server 1303.

In operation 1313, the second electronic device 1302 may transmit information about authentication related to the second electronic device 1302 and the security stability information of the second electronic device 1302 to the first electronic device 1301. The second electronic device 1302 may request authentication related to the second electronic device 1302 by transmitting the authentication-related information and the security stability information to the first electronic device 1301. The authentication-related information may include the information for identifying the second electronic device 1302 or the information for identifying the website connected to the second electronic device 1302. The security stability information may include a result of monitoring with respect to security stability of the second electronic device 1302.

In operation 1314, upon receiving the request for authentication related to the second electronic device 1302 from the second electronic device 1302, the first electronic device 1301 may verify the security stability information of the second electronic device 1302 and may identify whether to perform authentication related to the second electronic device 1302 based on the identified security stability information. The first electronic device 1301 may verify the security stability information of the second electronic device 1302 by using the authentication server 1303. For example, the security stability information may be encrypted by the authentication server 1303, and the first electronic device 1301 may receive information for decrypting the security stability information from the authentication server 1303. The security stability information may be changed in terms of a data form by the authentication server 1303, and the first electronic device 1301 may identify up-to-dateness of the data form of the security stability information.

When identifying that the security stability of the second electronic device 1302 is not good in operation 1315, the first electronic device 1301 may notify the second electronic device 1302 of authentication processing impossibility in operation 1316.

When identifying that the security stability of the second electronic device 1302 is good in operation 1315, the first electronic device 1301 may execute an authentication function to perform authentication related to the second electronic device 1302 in operation 1317.

In operation 1318, the first electronic device 1301 may search for encrypted authentication information stored in a security zone (e.g., the security zone 431 of FIG. 4) of a memory (e.g., the memory 430 of FIG. 4), based on the information about the related authentication received from the second electronic device 1302.

In operation 1319, the first electronic device 1301 may decrypt found encrypted authentication information.

In operation 1320, the first electronic device 1301 may transmit decrypted authentication information to the second electronic device 1302.

In operation 1321, the second electronic device 1302 may process authentication related to the second electronic device 1302 by using the decrypted authentication information received from the first electronic device 1301.

The embodiments disclosed in the present specification and drawings have been provided to easily describe the present disclosure and to help understanding of the present disclosure, and are not intended to limit the scope of the present disclosure. Therefore, it should be construed that the scope of the present disclosure includes any change or other various embodiments based on the technical spirit of the present disclosure as well as the embodiments described herein.

What is claimed is:

1. An electronic device comprising:
a communication module;
an input module;
a memory; and
a processor electrically connected with the communication module and the memory,
wherein the processor is configured to:
detect a communicative coupling with an external electronic device,
prior to receiving authentication-related information from the external electronic device, receive an input through the input module and authenticate a user based on the received input,
based on detecting successful authentication of the user, transmit a request for the authentication-related information and content stored in the external electronic device to the external electronic device,
based at least in part on receiving the authentication-related information from the external electronic device, identify whether the communicative coupling with the external electronic device is performed based on a first communication scheme which does not support a connection with other external electronic devices or a second communication scheme which supports the connection with the other external electronic devices,
if the communicative coupling is performed based on the first communication scheme, transmit authentication information in a decrypted state, which is indicated by the authentication-related information and stored in the memory to the external electronic device,
if the communicative coupling is performed based on the second communication scheme, encrypt the authentication information with an one-time password (OTP) scheme by using an authentication server and transmit OTP-encrypted authentication information to the external electronic device, and
after authentication related to the external electronic device is finished by the external electronic device using the authentication information, receive the content from the external electronic device through the communication module.

2. The electronic device of claim 1, wherein the authentication information comprises at least one of an identification (ID) and a password for logging in to a website connected to the external electronic device, a password for releasing function restriction of the external electronic device, or a password for adding a function to the external electronic device.

3. The electronic device of claim 1, wherein the memory comprises a security zone in which the authentication information is encrypted and stored, and
the processor is further configured to:
receive information about authentication related to the external electronic device from the external electronic device;
search for encrypted authentication information stored in the security zone of the memory, based on the information about authentication related to the external electronic device;
obtain encrypted authentication information corresponding to the information about authentication related to the external electronic device; and
decrypt the encrypted authentication information and transmit the authentication information to the external electronic device.

4. The electronic device of claim 1, wherein the processor is further configured to send a request for the information related to the external electronic device to the external electronic device.

5. The electronic device of claim 1, further comprising at least one input interface,
wherein the processor is further configured to:
obtain a user input for authentication related to the external electronic device by using the at least one input interface; and
perform authentication related to the external electronic device when the user input satisfies a designated condition.

6. The electronic device of claim 1, further comprising at least one biometric sensor,
wherein the processor is further configured to:
obtain user biometric information for authentication related to the external electronic device by using the at least one biometric sensor; and
perform authentication related to the external electronic device when the user biometric information satisfies a designated condition.

7. The electronic device of claim 1, wherein the processor module is further configured to:
obtain a signal for authentication related to the external electronic device from a first external electronic device, by using the communication module; and
perform authentication related to the external electronic device when the signal satisfies a designated condition.

8. The electronic device of claim 1, wherein the processor is further configured to:
send a request for OTP encryption information corresponding to a unique ID of the electronic device to the authentication server;

receive the OTP encryption information from the authentication server in response to the request; and encrypt the authentication information with the OTP scheme, at least based on the OTP encryption information and transmit OTP-encrypted authentication information and at least a part of the OTP encryption information to the external electronic device, and the OTP encryption information comprises an OTP password and at least one of the unique ID or an OTP ID.

9. A method for performing authentication related to an external electronic device by an electronic device, the method comprising:

- detecting a communicative coupling with the external electronic device;
- prior to receiving authentication related information from the external electronic device, receiving an input through an input module, and authenticating a user by at least one processor based on the received input;
- based on detecting successful authentication of the user, transmitting by a communication circuitry a request for the authentication related information and content stored in the external electronic device to the external electronic device;
- based at least in part on receiving the authentication related information from the external electronic device, identifying whether the communicative coupling with the external electronic device is performed based on a first communication scheme which does not support a connection with other external electronic devices or a second communication scheme which supports the connection with the other external electronic devices;
- if the communicative coupling is performed based on the first communication scheme, transmitting authentication information in a decrypted state, which is indicated by the authentication related information and retrieved from the memory to the external electronic device;
- if the communicative coupling is performed based on the second communication scheme, encrypting the authentication information with an one-time password (OTP) scheme by using an authentication server and transmitting OTP-encrypted authentication information to the external electronic device; and
- after authentication related to the external electronic device is finished by the external electronic device using the authentication information, receiving the content from the external electronic device by the communication circuitry.

10. A non-transitory computer recording medium storing instructions executable by at least one processor to cause the at least one processor to:

- detect a communicative coupling with an external electronic device connected to a website via a communication module,
- prior to receiving authentication related information from the external electronic device connected to the web site, receive an input through an input module and authenticate a user based on the received input,
- based on detecting successful authentication of the user, transmit a request for the authentication related information and content related to the web site to the external electronic device connected to the website via the communication module,
- based at least in part on receiving the authentication related information from the external electronic device connected to the website, identify whether the communicative coupling with the external electronic device is performed based on a first communication scheme which does not support a connection with other external electronic devices or a second communication scheme which supports the connection with the other external electronic devices;
- if the communicative coupling is performed based on the first communication scheme, transmit authentication information in a decrypted state, which is indicated by the received authentication related information and stored in a memory to the external electronic device connected to the website, wherein the authentication information comprises a password for logging on to the website;
- if the communicative coupling is performed based on the second communication scheme, encrypt the authentication information with an one-time password (OTP) scheme by using an authentication server and transmit OTP-encrypted authentication information to the external electronic device; and
- after authentication related to the external electronic device is finished by the external electronic device using the authentication information, receive the content from the website via the communication module.

* * * * *